(12) United States Patent
Franklin

(10) Patent No.: US 11,976,733 B2
(45) Date of Patent: May 7, 2024

(54) POPPET AND SEAT CARTRIDGE VALVE SUBASSEMBLY

(71) Applicant: Swagelok Company, Solon, OH (US)

(72) Inventor: Stephen James Franklin, Baldrine (IM)

(73) Assignee: SWAGELOK COMPANY, Solon, OH (US)

( * ) Notice: Subject to any disclaimer, the term of this patent is extended or adjusted under 35 U.S.C. 154(b) by 136 days.

(21) Appl. No.: 17/690,092

(22) Filed: Mar. 9, 2022

(65) Prior Publication Data

US 2022/0290762 A1 Sep. 15, 2022

Related U.S. Application Data

(60) Provisional application No. 63/180,166, filed on Apr. 27, 2021, provisional application No. 63/158,408, filed on Mar. 9, 2021.

(51) Int. Cl.
*F16K 1/46* (2006.01)
*F16K 17/04* (2006.01)
*F16K 27/02* (2006.01)

(52) U.S. Cl.
CPC .......... *F16K 1/465* (2013.01); *F16K 17/0466* (2013.01); *F16K 27/0209* (2013.01)

(58) Field of Classification Search
CPC .. F16K 1/465; F16K 17/0466; F16K 27/0254; Y10T 137/7613
See application file for complete search history.

(56) References Cited

U.S. PATENT DOCUMENTS

| 3,137,312 A | | 6/1964 | Dean | |
|---|---|---|---|---|
| 3,926,204 A | * | 12/1975 | Earl | G05D 16/0672 137/116.5 |

(Continued)

FOREIGN PATENT DOCUMENTS

| DE | 3636739 A1 | 5/1987 |
|---|---|---|
| DE | 102009003227 A1 | 11/2010 |

(Continued)

OTHER PUBLICATIONS

International Search Report and Written Opinion from PCT/US2022/019431 dated Aug. 18, 2022.

(Continued)

*Primary Examiner* — Kenneth Rinehart
*Assistant Examiner* — Nicole Gardner
(74) *Attorney, Agent, or Firm* — Calfee, Halter & Griswold LLP

(57) ABSTRACT

A valve subassembly includes a body plug, a poppet, and a seat carrier. The body plug includes a tubular side wall defining a central cavity and one or more lateral flow apertures in the side wall. The poppet includes axially extending upper and lower stem portions and a radially extending poppet sealing portion between the upper and lower stem portions, with the lower stem portion and the poppet sealing portion being received in the central cavity of the body plug. The seat carrier is assembled with the body plug and includes a central bore receiving the upper stem portion of the poppet therethrough, the seat carrier retaining a seat seal in radial alignment with the poppet sealing portion.

20 Claims, 7 Drawing Sheets

(56) References Cited

U.S. PATENT DOCUMENTS

| | | | |
|---|---|---|---|
| 4,693,267 A * | 9/1987 | Patterson | G05D 16/107 137/116.5 |
| 4,781,213 A | 11/1988 | Kilayko | |
| 4,942,899 A * | 7/1990 | Vork | G05D 16/0655 137/454.5 |
| 5,749,394 A | 5/1998 | Boehmer et al. | |
| 9,835,256 B2 * | 12/2017 | Bregazzi | F16K 1/42 |
| 2002/0020451 A1 | 2/2002 | Reid et al. | |
| 2006/0043324 A1 | 3/2006 | Kingsford | |
| 2009/0283152 A1 | 11/2009 | Mason | |
| 2010/0025401 A1 | 2/2010 | Jagemann et al. | |
| 2015/0369393 A1 | 12/2015 | Picht et al. | |
| 2016/0298772 A1 | 10/2016 | Barton | |

FOREIGN PATENT DOCUMENTS

| | | | |
|---|---|---|---|
| EP | 1197691 A2 | 4/2002 | |
| EP | 1450083 A1 | 8/2004 | |
| GB | 2458921 A | 10/2009 | |
| WO | 2016073822 A1 | 5/2016 | |
| WO | 2020236853 A1 | 11/2020 | |

OTHER PUBLICATIONS

International Search Report and Written Opinion from PCT/US2022/026098 dated Oct. 5, 2022.
Swagelok Company brochure, "Pressure Regulators RHPS Series", 76 pgs. dated Jan. 2016.
Swagelok Company brochure, "Pressure Regulators RHPS Series", 130 pgs., copyright 2019.
Office action from U.S. Appl. No. 17/727,920 dated Jun. 16, 2023.

* cited by examiner

POPPET AND SEAT CARTRIDGE VALVE SUBASSEMBLY

CROSS-REFERENCE TO RELATED APPLICATION

This application claims priority to and all benefit of U.S. Provisional Patent Application Ser. No. 63/158,408, filed on Mar. 9, 2021, for POPPET AND SEAT CARTRIDGE VALVE SUBASSEMBLY, and U.S. Provisional Patent Application Ser. No. 63/180,166, filed on Apr. 27, 2021, for POPPET-STYLE VALVE ARRANGEMENTS, the entire disclosures of both of which are incorporated herein by reference.

TECHNICAL FIELD OF THE INVENTIONS

The inventions relate to fluid flow and delivery devices and methods, and more particularly to poppet valves used to control fluid flow and delivery.

BACKGROUND OF THE INVENTIONS

Poppet style valves are well known for use as flow control mechanisms for gas and liquid fluid delivery, flow control, and pressure control. Poppet valve arrangements include an axially movable stem having a sealing portion (e.g., enlarged disc, tapered end) that seals against an annular seat in a valve passage when the stem is in a closed position and axially separates from the seat when the stem is in an open position, to permit fluid flow through the valve passage. Many different types of fluid control devices utilize poppet valve mechanisms, including, for example, diaphragm valves, bellows valves, and pressure regulators.

SUMMARY OF THE INVENTIONS

According to an exemplary embodiment of the present disclosure, a valve subassembly includes a body plug, a poppet, and a seat carrier. The body plug includes a tubular side wall defining a central cavity and one or more lateral flow apertures in the side wall. The poppet includes axially extending upper and lower stem portions and a radially extending poppet sealing portion between the upper and lower stem portions, with the lower stem portion and the poppet sealing portion being received in the central cavity of the body plug. The seat carrier is assembled with the body plug and includes a central bore receiving the upper stem portion of the poppet therethrough, the seat carrier retaining a seat seal in radial alignment with the poppet sealing portion.

According to another exemplary embodiment of the present disclosure, a pressure regulator includes a valve body housing, a valve subassembly, a loading mechanism, and a sensing element. The valve body housing including a central bore disposed between first and second end ports. The valve subassembly includes a body plug, a poppet, and a seat carrier. The body plug includes a tubular side wall defining a central cavity and one or more lateral flow apertures in the side wall. The body plug is installed in the central bore of the valve body, such that at least one of the one or more lateral flow apertures is in fluid communication with the first end port. The poppet includes axially extending upper and lower stem portions and a radially extending poppet sealing portion between the upper and lower stem portions, with the lower stem portion and the poppet sealing portion being received in the central cavity of the body plug. The seat carrier is assembled with the body plug and includes a central bore receiving the upper stem portion of the poppet therethrough, the seat carrier retaining a seat seal in radial alignment with the poppet sealing portion. The loading mechanism is assembled with the valve body housing and is operable to apply a set load force against the poppet for downward movement of the poppet. The sensing element is disposed between the loading mechanism and the poppet to transmit the load force from the loading mechanism to the poppet, wherein when fluid pressure within one of the first and second end ports exceeds a pressure setting corresponding to the set load force, the sensing element is movable against the set load force to permit upward movement of the poppet.

According to another exemplary embodiment of the present disclosure, a method of replacing a poppet and seat seal in a regulator valve assembly is contemplated. In the exemplary method, a regulator valve assembly is provided, including a valve body having a valve body housing defining a central bore, and a valve cartridge subassembly including a body plug and a seat carrier assembled together to retain the poppet and seat seal therebetween, with the body plug being installed in the central bore. The valve cartridge subassembly is removed from the valve body by disassembling the body plug from the valve body housing, thereby withdrawing the body plug, seat carrier, poppet, and seat seal from the central bore. A replacement valve cartridge subassembly is assembled with the regulator valve body to install a new poppet and seat seal in the valve body housing bore.

DESCRIPTION OF EXEMPLARY EMBODIMENTS

Figure 1:
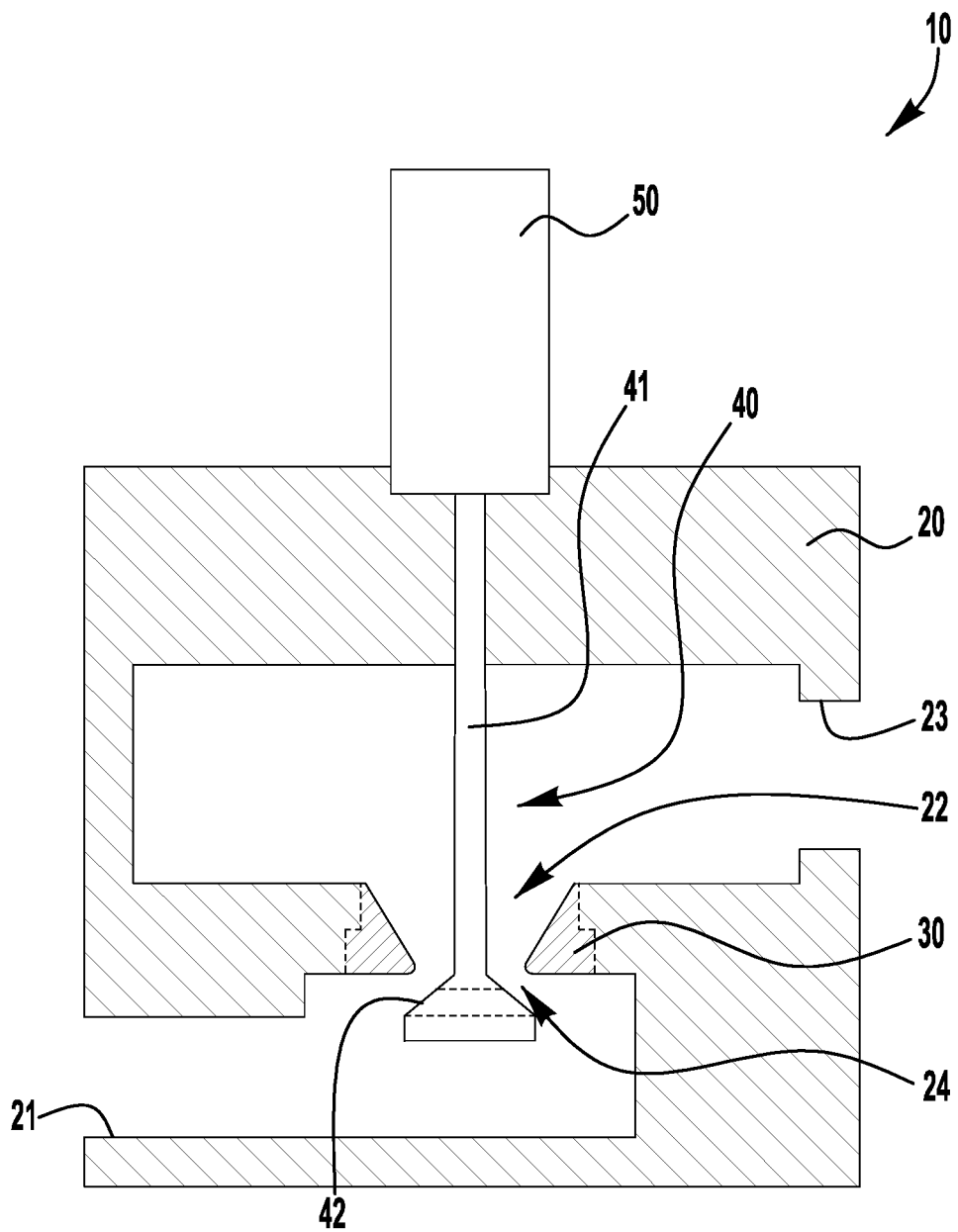
FIG. 1 is a cross-sectional schematic illustration of a poppet type valve assembly, in accordance with an exemplary embodiment of the present disclosure.

This Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while the specific embodiments described herein relate to pressure-reducing regulator valve arrangements, the features of the present application may additionally or alternatively be applied to other types of valves, including, for example, back-pressure regulator valve arrangements, shutoff valves, check valves, and relief valves. The terms "poppet valve" and "poppet type valve,"

as used herein, are intended to broadly include any valve that includes a stem that carries a sealing member that is brought into sealing engagement with an annular seat by longitudinal movement of the stem. The terms "seal" and "sealing engagement" are intended to include conditions of reduced flow resulting from contact between a sealing surface and a seating surface, in addition to a leak-tight or fluid-tight seal.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include the specified value, values within 5% of the specified value, and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

With reference to FIG. 1, in a schematically illustrated exemplary embodiment, a poppet type valve assembly 10 includes a valve body 20 defining a valve passage 22 between inlet and outlet ports 21, 23, and an annular valve seat 30 extending around an axially extending central portion 24 of the valve passage. A poppet 40 is assembled with the valve body 20 and includes an axially extending poppet stem 41 and a radially extending poppet sealing portion 42. An actuator 50 is assembled with the poppet stem 41 to control axial movement of the poppet 40 between a closed position, in which the poppet sealing portion 42 seals against the valve seat 30 (e.g., to prevent flow above an allowable leak rate), and an open position, in which the poppet sealing portion axially separates from the valve seat to permit fluid flow through the axially extending portion 24 of the valve passage 22. The actuator 50 may be user operable (e.g., manually, pneumatically, or electrically operable) for selective movement of the poppet 40. Alternatively, the actuator 50 may be configured to automatically move or permit movement of the poppet under certain predetermined system conditions. For example, an actuator arrangement may be configured to cause or permit automatic movement of the poppet 40 at a threshold system fluid pressure, for example, to relieve excess fluid pressure from a system (in the case of a relief valve), to prevent backflow (in the case of a check valve), or to reduce an outlet pressure (in the case of a pressure regulator). Examples of pressure regulators with poppet type valve arrangements are disclosed in a product catalog titled PRESSURE REGULATORS RHPS SERIES (MS-02-430, Rev K, May 2020), which is publicly available online and otherwise from Swagelok Company, and is fully incorporated herein by reference.

The seat and poppet sealing surfaces of a valve, such as a regulator valve, are often sensitive to contamination and susceptible to wear, particularly in high cycle applications. According to an exemplary aspect of the present disclosure, a valve may be provided with a poppet and seat subassembly facilitating replacement of the poppet and seat seal while shielding the poppet and seat sealing surfaces from user contact.

Figure 2:
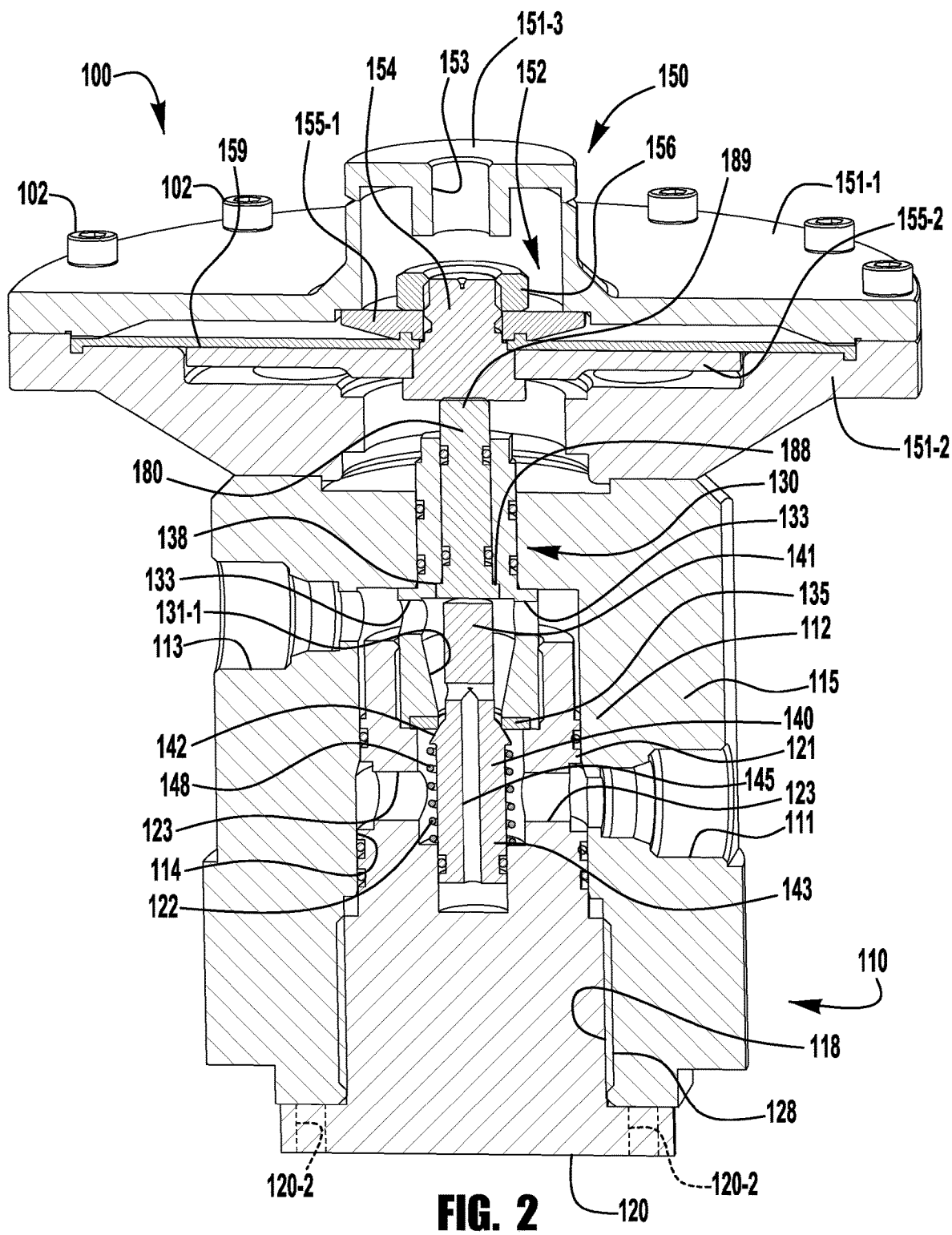
FIG. 2 is a cross-sectional view of a pressure regulator valve assembly, in accordance with another exemplary embodiment of the present disclosure.
Figure 2A:
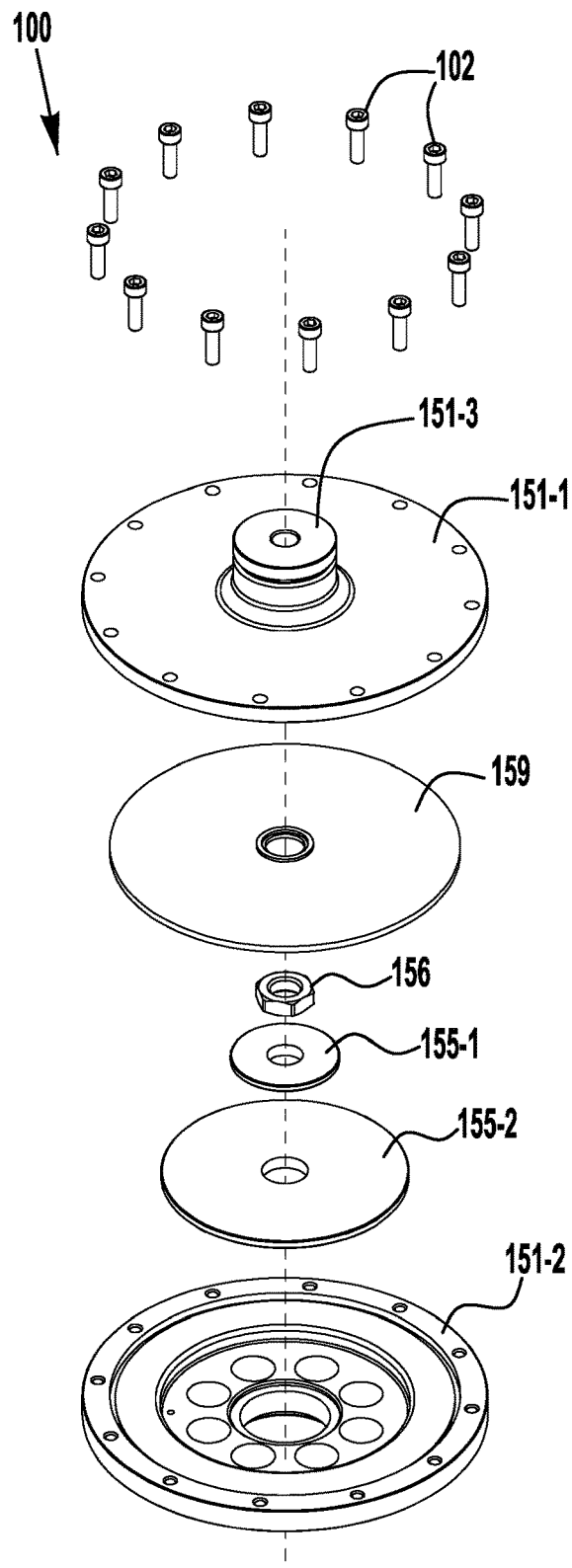
FIG. 2A is an exploded perspective view of the pressure regulator valve assembly of FIG. 2.
Figure 2A:
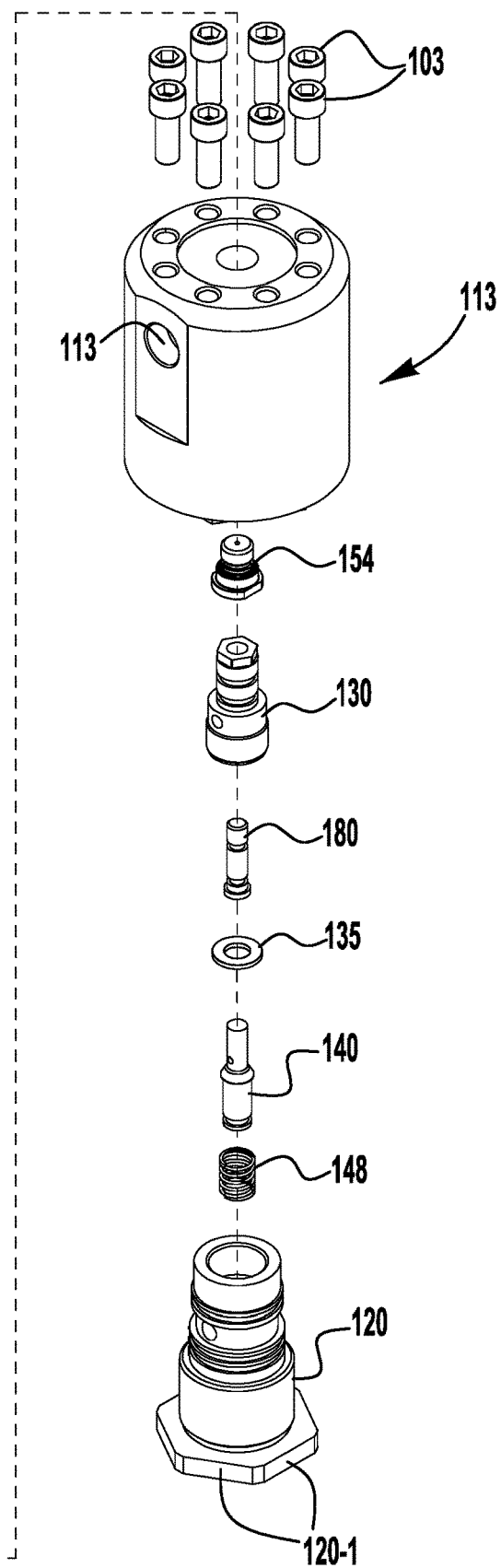

FIGS. 2 and 2A illustrate an exemplary pressure reducing regulator valve assembly 100 including a regulator valve body 110 defining a valve passage 112 between first end (e.g., inlet) and second end (e.g., outlet) ports 111, 113, and an annular valve seat seal 135 disposed in the valve body between the inlet and outlet ports. A poppet 140 is assembled with the valve body 110 and includes axially extending upper and lower stem portions 141, 143 and a radially extending poppet sealing portion 142 between the upper and lower stem portions. The poppet 140 is axially movable between a lower, open position in which the poppet sealing portion is axially spaced from the seat seal 135, and an upper, closed position in which the poppet sealing portion is in sealing engagement with the seat seal.

Figure 3:
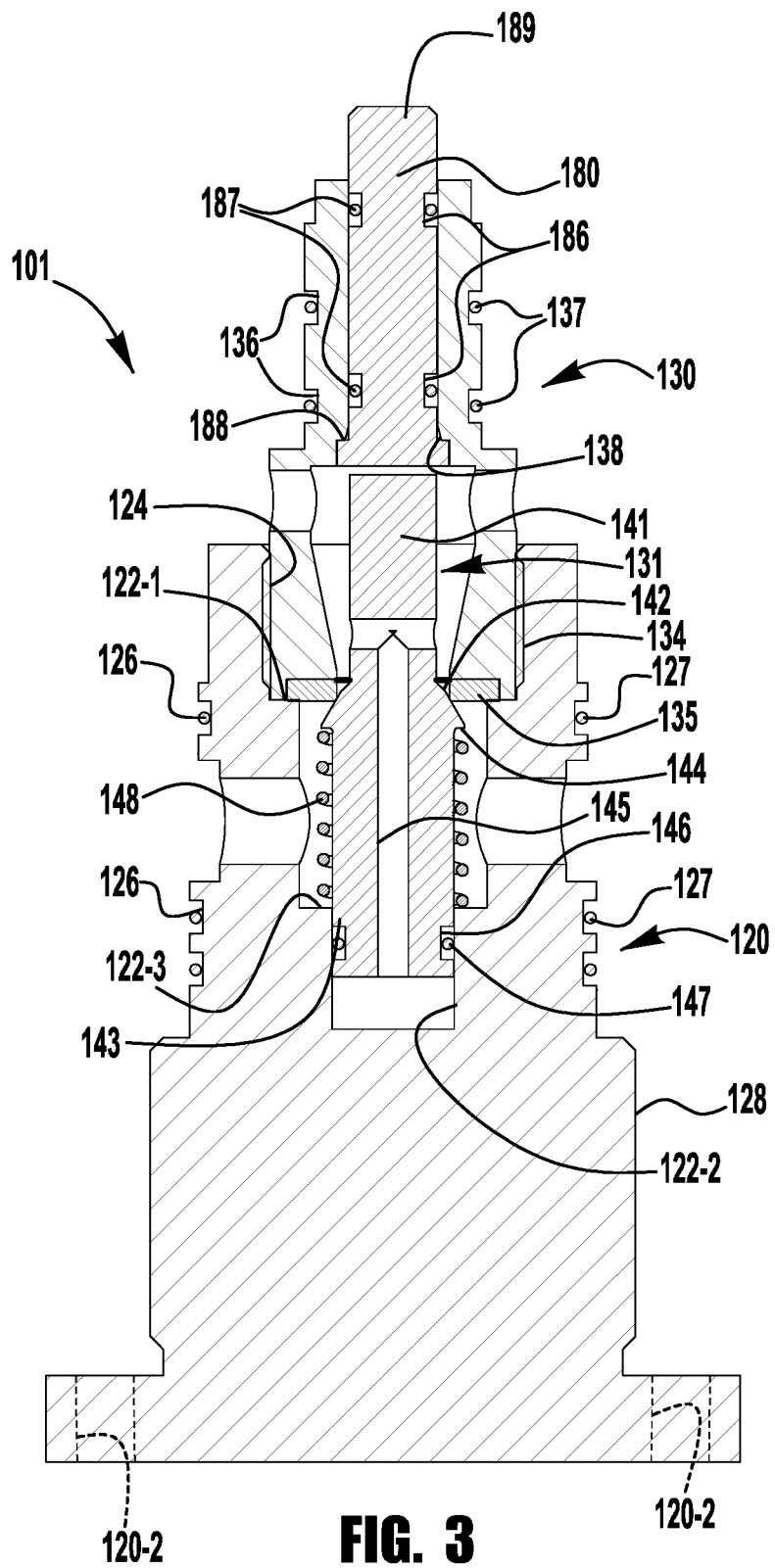
FIG. 3 is a cross-sectional view of the valve cartridge subassembly of the pressure regulator valve assembly of FIG. 2.

According to an exemplary aspect of the present disclosure, the regulator valve assembly 100 includes a valve cartridge subassembly 101 (as also shown in FIG. 3) configured to facilitate removal and replacement of the poppet 140 and seat seal 135, for example, to replace worn or damaged sealing surfaces. In the illustrated example, the subassembly 101 includes a body plug 120 having a tubular side wall 121 defining a central cavity 122 receiving the sealing portion 142 and lower stem portion 143 of the poppet 140, and a seat seal retaining seat carrier 130 that is assembled with the body plug over the poppet 140 to retain the poppet and seat seal 135 together as a replaceable cartridge subassembly.

The seat carrier 130 includes a male threaded lower end portion 134 that is threaded with a female threaded upper end portion 124 of the body plug 120, with the lower end portion of the seat carrier engaging an upper counterbore 122-1 in the body plug cavity 122, and an upper stem portion 141 of the poppet 140 extending into a central bore 131 of the seat carrier. The seat seal 135 is secured to or retained by (e.g., staked into, integral with) the lower end portion 134 of the seat carrier 130, in radial alignment with the poppet sealing portion 142, for engagement with the poppet sealing portion when the poppet 140 is in the closed position.

The body plug 120 is configured to be installed in a central bore 114 in a body housing 115 to form the valve body 110. The exemplary body plug 120 includes one or more lateral apertures 123 in the side wall 121 positioned to align with the valve body inlet port 111, and the exemplary seat carrier 130 includes one or more lateral apertures 133 positioned to align with the valve body outlet port 113, to allow for fluid flow from the inlet port into the body plug cavity 122, and between the poppet sealing portion 142 and the valve seat seal 135 to the outlet port when the poppet 140 is in an open position. The apertures 123, 133 may be circumferentially spaced around the body plug 120 and seat carrier 130, respectively, for example, to assure at least partial alignment of the inlet and outlet ports 111, 113 with at least one of the apertures 123, 133, regardless of the rotational positions of the body plug 120 and seat carrier 130 in the valve body housing 115. Additionally, the body plug 120 may be provided with an annular recess 123-1 intersected by the body plug apertures 123, for example, to provide a fluid flow path between the body plug apertures and the inlet port 111, regardless of any misalignment of the body plug apertures with the inlet port. The seat carrier bore 131 may be provided with a tapered internal surface 131-1, for example, to facilitate expansion of gases flowing through the seat carrier bore.

O-ring/gasket seals 127 (and backup rings, not shown) are provided in grooves 126 in the body plug 120 to provide a leak tight body seal between the inlet port 111 and the lower end of the central bore 114, and between the inlet port and the outlet port 113. One or more O-ring/gasket seals 137 (and backup rings, not shown) may be provided in grooves 136 in the seat carrier 130 to provide a leak tight seal between the outlet port 113 and the loading mechanism 150 (described in greater detail below).

Many different arrangements may be provided for secure installation of the body plug 120 in the body housing 115. For example, a male threaded portion 128 of the body plug 120 may be threaded with a female threaded portion 118 of the central bore 114. As shown in the exploded perspective view of FIG. 2A, an end portion of the body plug 120 may be provided with flat surfaces 120-1 for engagement and tightening by a tool (e.g., a torque wrench). Additionally or alternatively, the end portion of the body plug 120 may be provided with other tool engagement features, such as holes 120-2 for engagement with a spanner wrench.

Accordingly, in an exemplary method of replacing a poppet 140 and seat seal 135 in a regulator valve assembly 100 (e.g., to replace worn/damaged sealing surfaces), a valve cartridge subassembly 101, including a body plug 120 and a seat carrier 130 assembled together to retain the poppet 140 and seat seal 135 therebetween, is removed from the regulator valve body 110 by disassembling (e.g., unthreading) the body plug from the regulator valve body housing 115, thereby withdrawing the body plug, seat carrier, poppet, and seat seal from a central bore 114 of the regulator valve body housing. A replacement valve cartridge subassembly, which may (but need not) be substantially identical to the removed valve cartridge subassembly, is then assembled with the regulator valve body to install a new poppet 140 and seat seal 135 in the regulator valve body bore 114.

Figure 4:
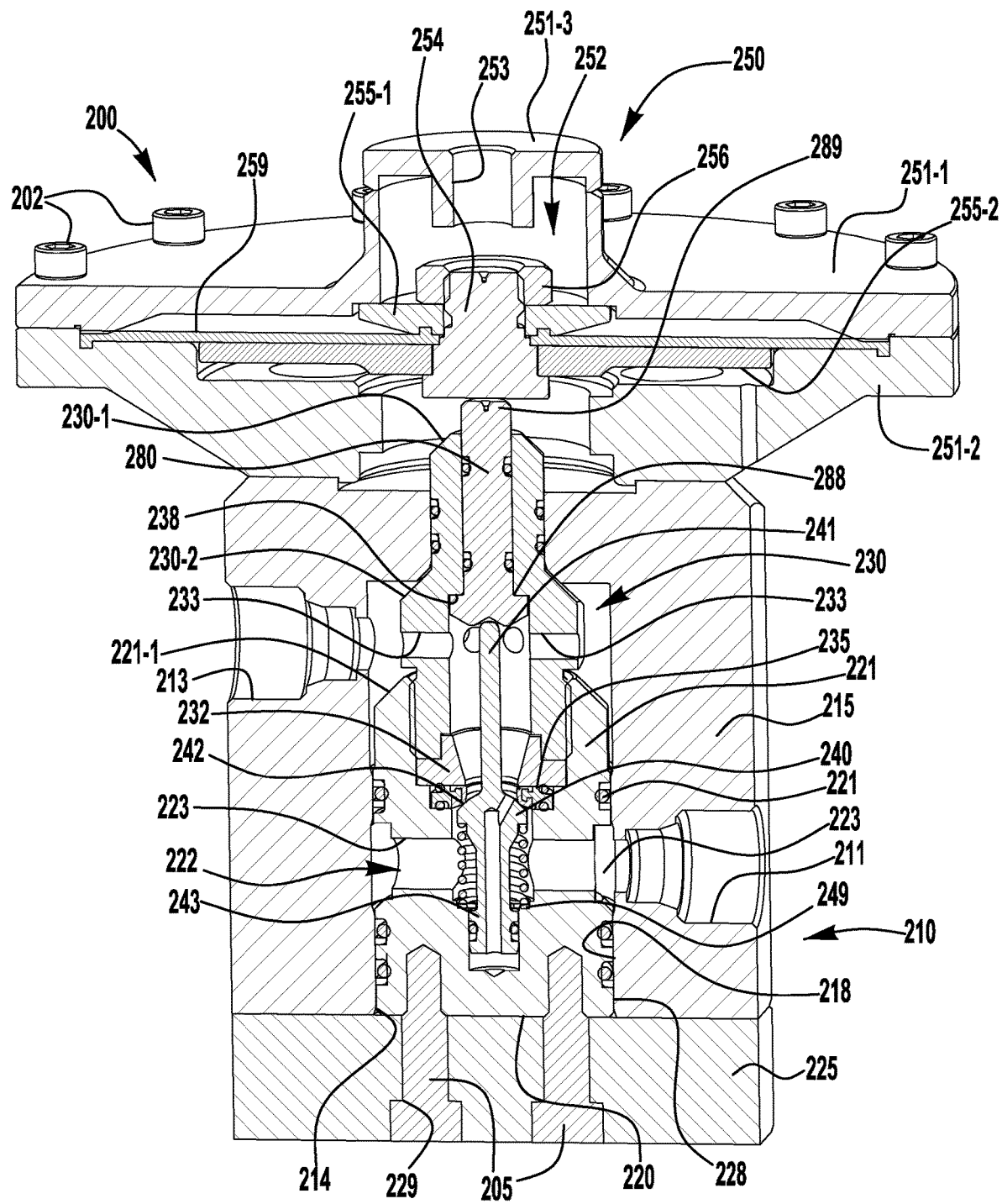
FIG. 4 is a cross-sectional view of a pressure regulator valve assembly, in accordance with another exemplary embodiment of the present disclosure.
Figure 4A:
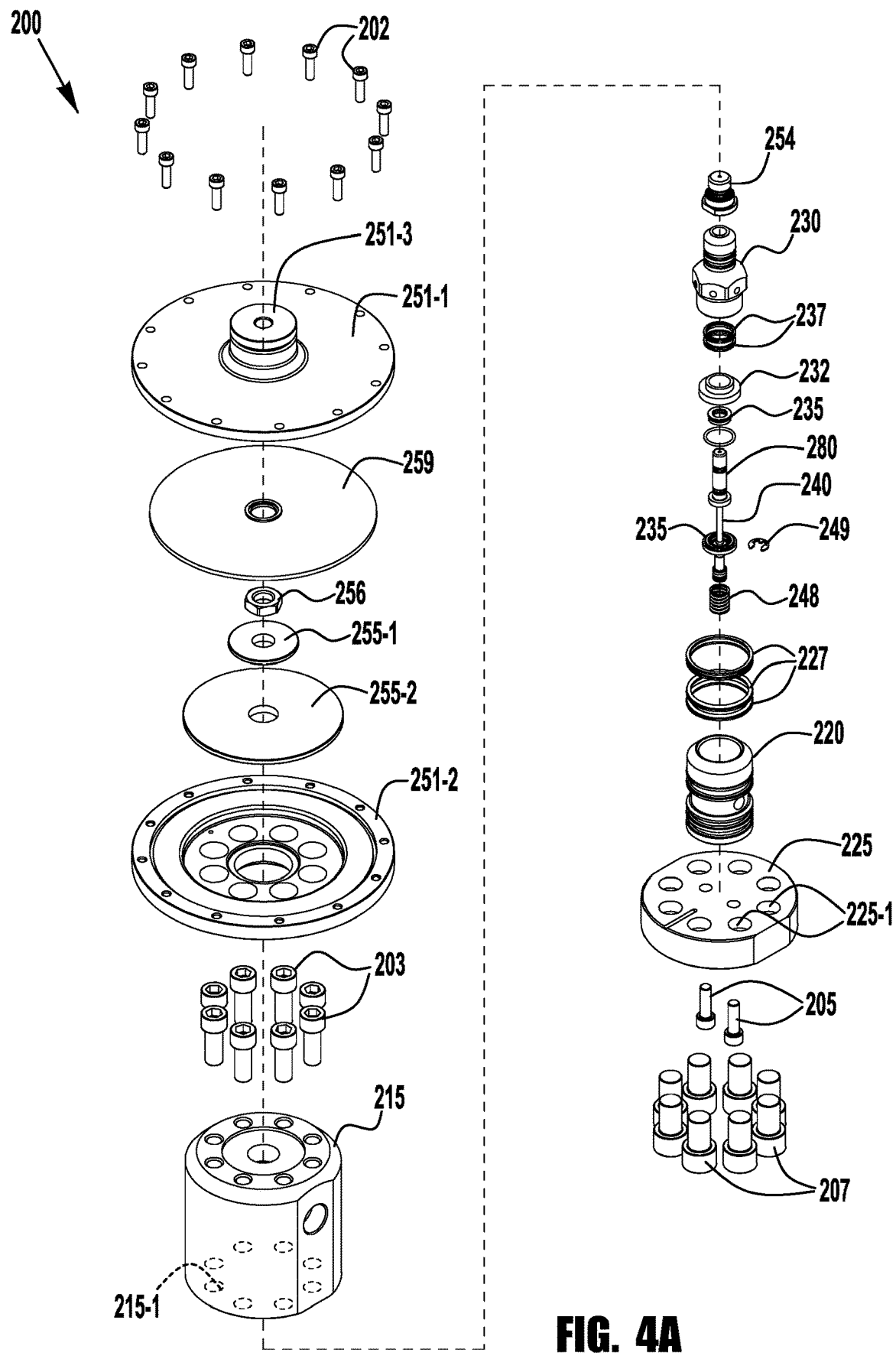
FIG. 4A is an exploded perspective view of the pressure regulator valve assembly of FIG. 4.

In other embodiments, a valve cartridge subassembly may include a body plug that is secured with the valve body by a bolted-on arrangement, for example, to reduce the installation torque required during assembly/reassembly. FIGS. 4 and 4A illustrate an exemplary pressure reducing regulator valve assembly 200 including a regulator valve body 210 defining a valve passage 212 between first end (e.g., inlet) and second end (e.g., outlet) ports 211, 213, and an annular valve seat seal 235 disposed in the valve body between the inlet and outlet ports. A poppet 240 is assembled with the valve body 210 and includes axially extending upper and lower stem portions 241, 243 and a radially extending poppet sealing portion 242 between the upper and lower stem portions. The poppet 240 is axially movable between a lower, open position in which the poppet sealing portion is axially spaced from the seat seal 235, and an upper, closed position in which the poppet sealing portion is in sealing engagement with the seat seal.

Figure 5:
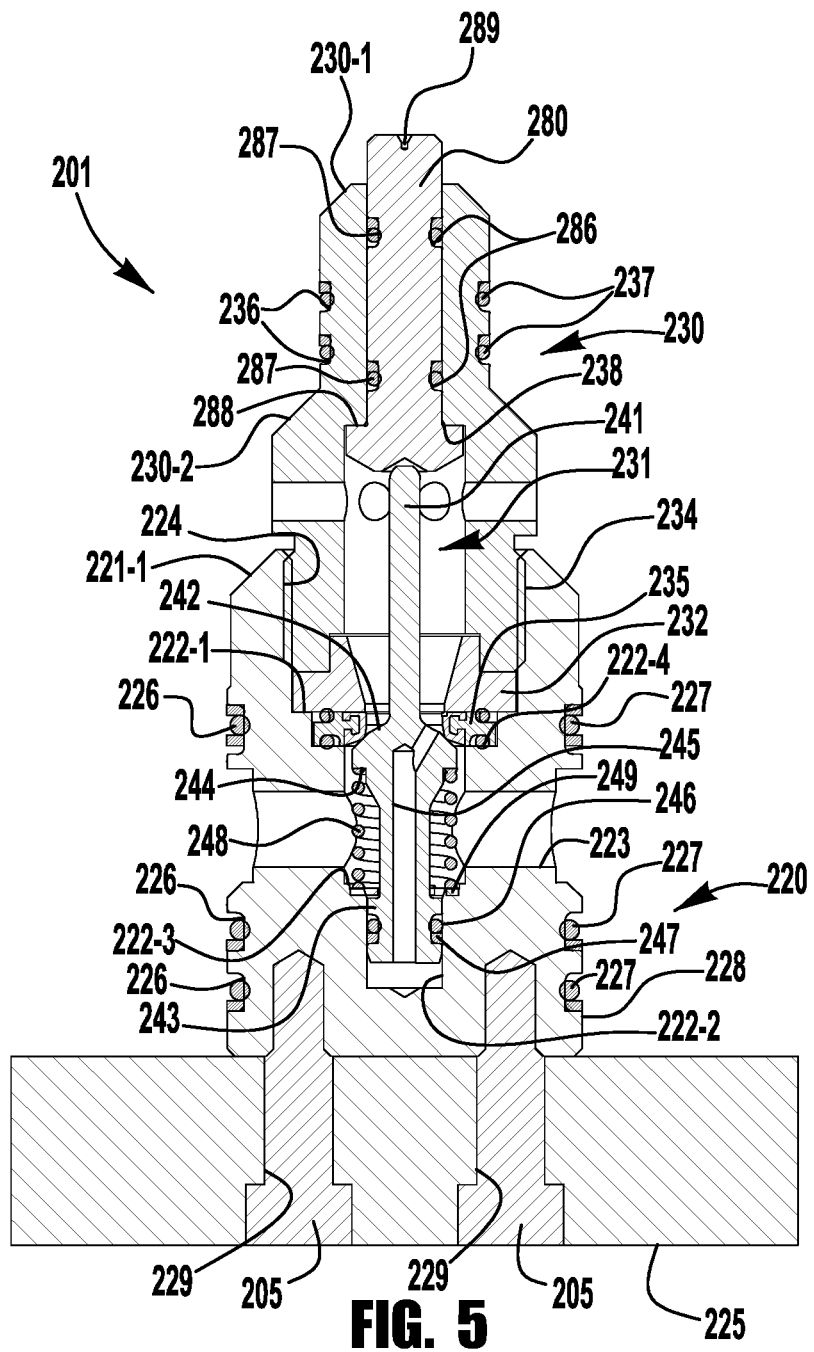
FIG. 5 is a cross-sectional view of the valve cartridge subassembly of the pressure regulator valve assembly of FIG. 4.

The regulator valve assembly 200 includes a valve cartridge subassembly 201 (as also shown in FIG. 5) configured to facilitate removal and replacement of the poppet 240 and seat seal 235, for example, to replace worn or damaged sealing surfaces. In the illustrated example, the subassembly 201 includes a body plug 220 having a tubular side wall 221 defining a central cavity 222 receiving the sealing portion 242 and lower stem portion 243 of the poppet 240, and a seat seal retaining seat carrier 230 that is assembled with the body plug over the poppet 240 to retain the poppet and seat seal 235 together as a replaceable cartridge subassembly 201.

The seat carrier 230 includes a male threaded lower end portion 234 that is threaded with a female threaded upper end portion 224 of the body plug 220. In the illustrated embodiment, the seat carrier 230 is provided with an extension or gland 232 seated against a lower end portion of the seat carrier, and engaging a first upper counterbore 222-1 in the body plug cavity 222. By providing the seat carrier as a two component configuration, surface features of the seat carrier (e.g., the tapered internal surface 231-1, described below) may be more easily manufactured. An upper stem portion 241 of the poppet 240 extends into a central bore 231 of the seat carrier 230. While the seat seal may be staked with the seat carrier or seat carrier gland, in the illustrated embodiment, the seat seal 235 is provided as a separate sealing ring, secured between the seat carrier gland 232 and a second upper counterbore 222-4 in the body plug cavity, for engagement with the poppet sealing portion when the poppet 240 is in the closed position. As shown, the seat seal 235 may be provided with grooves retaining gasket/O-ring seals for sealing engagement with the seat carrier gland 232 and second upper counterbore 222-4.

While many different types of sealing rings may be used, in the illustrated embodiment, the sealing ring 235 may be provided as an over-molded, overlaid, or otherwise interlocking annular softer material (e.g., having a hardness less than about 100 HRM) seal ring that is secured to or retained on (e.g., press fit, assembled over, injection molded or over-molded onto, or 3D printed onto) a harder (e.g., a hardness greater than about 80 HRB) inner circumferential rib, flange, rail, or other such projection protruding into the central portion of the valve passage. The rigid underlying projection allows for the use of a relatively thin (e.g., between about 0.05 and about 0.10 inches) seal ring, thereby minimizing thermal expansion, material flow, and deformation of the softer seal ring material, while providing rigid support to facilitate use in higher pressure (e.g., up to about 6000 psi) applications. Any suitable materials may be used to provide adequate sealing performance within the valve. For example, the seal ring may be provided in suitable plastic (e.g., PEEK), and the seal ring retaining projection may be provided in a metal (e.g., stainless steel). The gasket/O-ring seals may be formed from a suitable elastomer (e.g., ethylene propylene diene monomer (EPDM), perfluoro-elastomer, or nitrile). Exemplary seat sealing rings having interlocking seal portions are described in co-pending U.S. Provisional Patent Application Ser. No. 63/180,166, entitled POPPET-STYLE VALVE ARRANGEMENTS, the entire disclosure of which is incorporated herein by reference.

The body plug 220 is configured to be installed in a central bore 214 in a body housing 215 to form the valve body 210. The exemplary body plug 220 includes one or more lateral apertures 223 in the side wall 221 positioned to align with the valve body inlet port 211, and the exemplary seat carrier 230 includes one or more lateral apertures 233 positioned to align with the valve body outlet port 213, to allow for fluid flow from the inlet port 211 into the body plug cavity 222, and between the poppet sealing portion 242 and the valve seat seal 235 to the outlet port 213 when the poppet 240 is in an open position. The apertures 223, 233 may be circumferentially spaced around the body plug 220 and seat carrier 230, respectively, for example, to assure at least partial alignment of the inlet and outlet ports 211, 213 with at least one of the apertures 223, 233, regardless of the rotational positions of the body plug 220 and seat carrier 230 in the valve body housing 215. Additionally, the body plug 220 may be provided with an annular recess 223-1 intersected by the body plug apertures 223, for example, to provide a fluid flow path between the body plug apertures and the inlet port 211, regardless of any misalignment of the body plug apertures with the inlet port.

O-ring/gasket seals (e.g., gaskets and backup rings) 227 are provided in grooves 226 in the body plug 220 to provide a leak tight body seal between the inlet port 211 and the lower end of the central bore 214, and between the inlet port and the outlet port 213. One or more O-ring/gasket seals (e.g., with backup rings) 237 may be provided in grooves 236 in the seat carrier 230 to provide a leak tight seal between the outlet port 213 and the loading mechanism 250 (described in greater detail below).

Many different arrangements may be provided for secure installation of the body plug 220 in the body housing 215. In the illustrated embodiment, a mounting plate 225 is secured to a lower end of the body plug 220, for example, by mounting bolts 205, to secure the body plug to the body housing 215 when the tubular side wall 221 is axially inserted into the body housing bore 214. In other embodiments, the mounting plate may be integrally formed with, welded to, or otherwise affixed to the body plug. As shown in FIG. 4A, the mounting plate 225 includes a ring of mounting holes 225-1 that align with body housing mounting holes 215-1 to receive mounting bolts 207 for securing the body plug 220, when inserted in the body housing bore 214, to the valve body housing 215. The mounting holes 225-1 may be evenly spaced around the mounting plate 225 to allow for attachment of the mounting plate to the valve body housing 215 in multiple orientations. Alternatively, the mounting plate and body housing mounting holes 225-1, 215-1 may be arranged to ensure mounting in a single orientation.

In an exemplary method of replacing a poppet 240 and seat seal 235 in a regulator valve assembly 200 (e.g., to replace worn/damaged sealing surfaces), a valve cartridge subassembly 201, including a body plug 220 and a seat carrier 230 assembled together to retain the poppet 240 and seat seal 235 therebetween, is removed from the regulator valve body 210 by removing mounting bolts 207 from the mounting plate and body housing mounting holes 225-1, 215-1 and withdrawing the body plug, seat carrier, poppet, and seat seal from the central bore 214 of the regulator valve body housing 215. A replacement valve cartridge subassembly 201, which may (but need not) be substantially identical to the removed valve cartridge subassembly, is then assembled with the regulator valve body housing 215 by axially inserting the tubular end portion 221 of the body plug 220 into the body housing bore 214. As shown, the upper or leading end portions of the seat carrier 230 and the body plug 220 may be provided with tapered or chamfered surfaces 230-1, 230-2, 221-1, for example, to facilitate alignment and insertion of the seat carrier and body plug. The body plug 220 is then secured by mounting bolts 207 installed through aligned mounting holes 225-1, 215-1 in the mounting plate 225 and body housing 215, to secure the new poppet 240 and seat seal 235 in the regulator valve body bore 214.

A regulator valve assembly may include a sensing element (e.g., diaphragm, piston) upon which fluid pressure (e.g., pressurized fluid in the outlet port of a pressure-reducing regulator) may act against a load force applied by a loading mechanism (e.g., biasing spring, pressurized "dome" chamber) to move the sensing mechanism when the fluid pressure exceeds a pressure setting, for movement of the poppet. While a poppet in a poppet and seat cartridge subassembly may extend beyond the seat carrier for engagement with an external sensing element, in the illustrated embodiments, a piston sensing element 180, 280 is assembled with the central bore 131, 231 of the seat carrier 130, 230, stacked above the upper stem portion 141, 241 of the poppet 140, 240. One or more O-ring/gasket seals (e.g., with backup rings) 187, 287 may be provided in grooves 186, 286 in the piston 180, 280 to seal with the seat carrier bore 131, 231, to provide a leak tight seal between the outlet port 113, 213 and the loading mechanism 150, 250. The piston 180, 280 may be provided with a shoulder portion 188, 288 that engages a counterbore 138, 238 in the seat carrier 130, 230 to retain the piston 180, 280 with the valve cartridge subassembly 101, 201.

The loading mechanism (e.g., a fluid pressurized chamber or dome loading mechanism 150, 250, as shown) applies a downward force to the poppet 140, 240 through the piston 180, 280, to bias the poppet toward the open position. The outlet port 113, 213 is in fluid communication with the piston 180, 280, such that pressurized fluid in the outlet port applies an upward force against the piston. In such an arrangement, when the outlet port pressure exceeds a set pressure, the upward fluid pressure force against the piston 180, 280 exceeds the downward loading mechanism force, causing the piston to move upward, thereby allowing the poppet 140, 240 to move to the closed position.

As shown, the poppet 140, 240 may be provided with an internal passage 145, 245 extending from the lower stem portion 143, 243 of the poppet to an upper portion of the poppet downstream of (i.e., above) the seat seal 135, 235 with a gasket seal 147, 247 (in groove 146, 246) providing a seal between the poppet lower stem portion and a narrower base portion 122-2, 222-2 of the body plug cavity 122, 222, such that when the poppet 140, 240 is in the closed position, the inlet or upstream fluid pressure on the poppet is offset by the outlet or downstream fluid pressure. This arrangement may be referred to as a balanced poppet design, which may, for example, provide for reduced seat load, for example, to reduce wear/deformation of the seat. In such an arrangement, a poppet spring 148, 248 may be provided in the body plug cavity 122, 222, compressed between a lower counterbore 122-3, 222-3 and the poppet 140, 240 (e.g., at shoulder 144, 244) to provide a consistent closing/sealing force against the poppet, independent of system fluid pressure.

To assemble the exemplary valve subassembly 101 of FIGS. 2, 2A, and 3, the poppet 140 and poppet spring 148 are inserted into the central cavity 122 of the body plug 120 with the lower stem portion 143 of the poppet received in the narrower base portion 122-2 of the body plug cavity 122, and the poppet spring engaging the lower counterbore 122-3 of the body plug cavity. The piston 180 is installed through the central bore 131 of the seat carrier 130, from the bottom end, with the lower shoulder portion 188 of the piston engaging the counterbore 138 in the seat carrier. The seat carrier 130, with the staked seat seal 135, is threadably assembled with the body plug 120, with the lower end portion 134 of the seat carrier engaging the upper counterbore 122-1 in the body plug cavity 122.

To assemble the exemplary valve subassembly 201 of FIGS. 4, 4A, and 5, the poppet 240 and poppet spring 248 (secured with the poppet 240 using retaining ring 249) are inserted into the central cavity 222 of the body plug 220 with the lower stem portion 243 of the poppet received in the narrower base portion 222-2 of the body plug cavity 222, and the poppet spring engaging the lower counterbore 222-3 of the body plug cavity. The piston 280 is installed through the central bore 231 of the seat carrier 230, from the bottom end, with the lower shoulder portion 288 of the piston engaging the counterbore 238 in the seat carrier. The seat seal assembly 235 and seat carrier gland 232 are inserted in the body plug counterbores 222-4, 222-1, and the seat carrier 230 is threadably assembled with the body plug 220, such that the seat seal assembly is sealingly secured between the seat carrier extension and the second upper body plug counterbore 222-4.

Many different types of loading mechanisms may be utilized to apply a selected downward biasing force against the sensing element. In the illustrated examples, a piston sensing dome loading arrangement 150, 250 includes upper and lower dome housing shell members 151-1, 251-1, 151-2, 251-2 (secured together, for example, by bolts 102, 202) assembled with the valve body housing 115, 215 (e.g., by mounting screws, 103, 203) to define a dome chamber 152, 252, and a dome loading diaphragm 159, 259 having an outer periphery captured between the upper and lower shell members, with a diaphragm screw 154, 254 installed through a central opening in the dome loading diaphragm and positioned to engage the upper end portion 186, 286 of the piston 180, 280. In the illustrated examples, support plates 155-1, 255-1, 155-2, 255-2 are secured to the diaphragm screw 154, 254 above and below the dome loading diaphragm 159, 259 by a nut 156, 256, to provide additional support for the diaphragm. The upper dome housing shell member 151-1, 251-1 includes a pressurization port 153, 254 (e.g., defined by welded end cap 151-3, 251-3) for supplying a pressurized fluid at a set pressure (e.g., from a secondary pressure regulator) to the dome chamber 152, 252, to apply a corresponding load force against the dome loading diaphragm 159, 259 to move the diaphragm screw 154, 254 against the piston 180, 280. In another exemplary embodiment, an actuator arrangement may include a compressed spring that applies a downward biasing force (directly or indirectly) to the diaphragm. In one such embodiment, compression of the spring may be adjustable to increase or decrease the downward biasing force exerted by the spring. For example, a spring guide engaging the upper end of the spring may be lowered or raised (e.g., by a rotatable knob or handle) to increase or reduce the compression of the spring. Exemplary dome pressurized and spring loading arrangements are described in the above incorporated PRESSURE REGULATORS RHPS SERIES catalog.

Other types of sensing mechanisms may also be used instead of the exemplary piston, such as, for example, diaphragm elements or piston elements external to the valve subassembly, as described in the above incorporated PRESSURE REGULATORS RHPS SERIES catalog.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A valve subassembly comprising:
   a body plug including a tubular side wall defining a central cavity and one or more lateral flow apertures in the side wall;
   a poppet including axially extending upper and lower stem portions and a radially extending poppet sealing portion between the upper and lower stem portions, with the lower stem portion and the poppet sealing portion being received in the central cavity of the body plug;
   a seat carrier including a central bore receiving the upper stem portion of the poppet therethrough, the seat carrier retaining a seat seal in radial alignment with the poppet sealing portion; and
   a piston assembled with the central bore of the seat carrier and including a lower end portion engaging the upper stem portion of the poppet and an upper end portion extending above the seat carrier;
   wherein the seat carrier is assembled with the body plug to retain the poppet, the seat seal, and the piston together with the seat carrier and the body plug as a replaceable cartridge subassembly.

2. The valve subassembly of claim 1, wherein the seat carrier is threadably assembled with the body plug.

3. The valve subassembly of claim 1, wherein the seat carrier includes one or more lateral flow apertures.

4. The valve subassembly of claim 1, wherein the seat seal is staked into a lower end portion of the seat carrier.

5. The valve subassembly of claim 1, further comprising a poppet spring disposed in the central cavity of the body plug, the poppet spring applying an upward biasing force to the poppet, toward sealing engagement with the seat seal.

6. The valve subassembly of claim 1, wherein the piston includes a shoulder portion that engages a counterbore in the central bore of the seat carrier to retain the piston with the seat carrier.

7. A valve comprising:
   a valve body housing including a central bore disposed between first and second end ports; and
   the valve subassembly of claim 1, wherein the body plug is installed in the central bore of the valve body, such that at least one of the one or more lateral flow apertures is in fluid communication with the first end port.

8. The valve of claim 7, wherein the body plug is threadably assembled with the central bore of the valve body housing.

9. The valve of claim 7, wherein the body plug includes an end flange fastened to the valve body housing.

10. A pressure regulator comprising:
    a valve body housing including a central bore disposed between first and second end ports;
    the valve subassembly of claim 1; and a loading mechanism assembled with the valve body housing and operable to apply a set load force against the poppet for downward movement of the poppet; and wherein the piston of the valve subassembly functions as a sensing element disposed between the loading mechanism and the poppet of the valve subassembly to transmit the load force from the loading mechanism to the poppet, wherein when fluid pressure within one of the first and second end ports exceeds a pressure setting corresponding to the set load force, the sensing element is movable against the set load force to permit upward movement of the poppet.

11. The pressure regulator of claim 10, wherein the seat carrier is threadably assembled with the body plug.

12. The pressure regulator of claim 10, wherein the seat carrier includes one or more lateral flow apertures.

13. The pressure regulator of claim 10, wherein the seat seal is staked into a lower end portion of the seat carrier.

14. The pressure regulator of claim 10, further comprising a poppet spring disposed in the central cavity of the body plug, the poppet spring applying an upward biasing force to the poppet, toward sealing engagement with the seat seal.

15. The pressure regulator of claim 10, wherein the piston includes a shoulder portion that engages a counterbore in the central bore of the seat carrier to retain the piston with the seat carrier.

16. The pressure regulator of claim 10, wherein the body plug is threadably assembled with the central bore of the valve body housing.

17. The pressure regulator of claim 10, wherein the body plug includes an end flange fastened to the valve body housing.

18. A method of replacing a poppet and seat seal in a regulator valve assembly, the method comprising:

providing a regulator valve assembly including a valve body having a valve body housing defining a central bore, and the valve subassembly of claim 1, with the body plug of the valve subassembly being installed in the central bore;

removing the valve subassembly from the valve body by disassembling the body plug from the valve body housing, thereby withdrawing the body plug, the seat carrier, the poppet, the piston, and the seat seal from the central bore; and assembling a replacement valve subassembly with the regulator valve body to install a new poppet, piston and seat seal in the valve body housing bore.

19. The method of claim 18, wherein the body plug includes a male threaded outer portion and the central bore comprises a female threaded portion, wherein disassembling the body plug from the valve body housing comprises unthreading the body plug from the central bore.

20. The method of claim 18, wherein the body plug includes a mounting plate extending from an end portion of the body plug, wherein disassembling the body plug from the valve body housing comprises removing mounting bolts securing the mounting plate to the valve body housing.

* * * * *